US010185465B1

(12) United States Patent
Capano

(10) Patent No.: US 10,185,465 B1
(45) Date of Patent: Jan. 22, 2019

(54) TECHNIQUES FOR PRESENTING INFORMATION ON A GRAPHICAL USER INTERFACE

(71) Applicant: Symantec Corporation, Mountain View, CA (US)

(72) Inventor: Gregory S. Capano, Van Nuys, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 868 days.

(21) Appl. No.: 14/219,584

(22) Filed: Mar. 19, 2014

(51) Int. Cl.
*G06F 3/0482* (2013.01)

(52) U.S. Cl.
CPC .................. *G06F 3/0482* (2013.01)

(58) Field of Classification Search
CPC ...... H04L 41/22; H04L 43/045; G06F 3/0482
See application file for complete search history.

(56) References Cited

U.S. PATENT DOCUMENTS

| 5,774,669 | A * | 6/1998 | George | H04L 41/0213 709/224 |
| 6,445,774 | B1 * | 9/2002 | Kidder | H04M 3/10 379/14.01 |
| 6,628,304 | B2 * | 9/2003 | Mitchell | G06F 3/0481 715/734 |
| 6,633,312 | B1 * | 10/2003 | Rochford | H04L 43/0817 709/223 |
| 7,146,568 | B2 * | 12/2006 | Richardson | H04L 41/0893 709/220 |
| 7,594,267 | B2 * | 9/2009 | Gladstone | G06F 21/55 725/25 |
| 8,321,790 | B2 * | 11/2012 | Sherrill | G05B 23/0267 715/734 |
| 2002/0012011 | A1 * | 1/2002 | Roytman | H04L 41/069 715/736 |
| 2002/0087882 | A1 * | 7/2002 | Schneier | G06F 21/552 726/23 |
| 2002/0140725 | A1 * | 10/2002 | Horii | G06F 11/0709 715/736 |
| 2003/0046390 | A1 * | 3/2003 | Ball | H04L 41/12 709/224 |
| 2004/0155899 | A1 * | 8/2004 | Conrad | H04L 43/0817 715/736 |
| 2005/0289230 | A1 * | 12/2005 | Chen | H04L 41/22 709/224 |

(Continued)

OTHER PUBLICATIONS

Sufing Network Topology CHapter 12. Zenmap GUI Users' Guide wayback machince capture Dec. 31, 2010 5 pages.*

*Primary Examiner* — Andrea N Long
(74) *Attorney, Agent, or Firm* — Maschoff Brennan

(57) ABSTRACT

Techniques for presenting information on a graphical user interface are disclosed. In one embodiment, the techniques may be realized as a method for presenting information on a graphical user interface including displaying an endpoint interface via the graphical user interface on a display unit, determining whether an event mode for the endpoint interface has been selected, displaying the endpoint interface in the event mode when the event mode has been selected, determining whether an event has been detected, and displaying the detected event on the endpoint interface in the event mode when the event has been detected.

18 Claims, 12 Drawing Sheets

(56) References Cited

U.S. PATENT DOCUMENTS

| | | | | |
|---|---|---|---|---|
| 2006/0026275 A1* | 2/2006 | Gilmour | H04L 41/22 | 709/223 |
| 2007/0188494 A1* | 8/2007 | Agutter | G06F 17/30554 | 345/440 |
| 2009/0271725 A1* | 10/2009 | Dirla | H04L 41/12 | 715/771 |
| 2010/0020700 A1* | 1/2010 | Kailash | H04L 12/2602 | 370/242 |
| 2011/0099500 A1* | 4/2011 | Smith | G06F 3/0482 | 715/771 |
| 2011/0126111 A1* | 5/2011 | Gill | G06F 21/55 | 715/736 |
| 2011/0246897 A1* | 10/2011 | Lee | G06Q 10/10 | 715/735 |
| 2011/0289119 A1* | 11/2011 | Hu | G06F 9/5072 | 707/803 |
| 2012/0284278 A1* | 11/2012 | Ikegami | G06Q 10/06 | 707/741 |
| 2013/0291034 A1* | 10/2013 | Basile | H04N 17/004 | 725/107 |
| 2014/0310605 A1* | 10/2014 | Basile | H04L 41/22 | 715/736 |
| 2015/0310645 A1* | 10/2015 | Baumecker | G06F 9/30 | 345/440 |
| 2015/0381434 A1* | 12/2015 | Tamvada | H04L 41/22 | 715/736 |
| 2016/0269249 A1* | 9/2016 | Maes | H04L 41/12 | |

* cited by examiner

TECHNIQUES FOR PRESENTING INFORMATION ON A GRAPHICAL USER INTERFACE

FIELD OF THE DISCLOSURE

The present disclosure relates generally to a graphical user interface and, more particularly, to techniques for presenting information on a graphical user interface.

BACKGROUND OF THE DISCLOSURE

Visualization and management of a large volume of information on a graphical user interface can often be challenging. One example of a need for visualization and management of large volumes of information is for events that occur across the deployment of endpoints within a network. For instance, it is difficult for a user to easily visualize events such as virus or malware outbreaks across multiple endpoints deployed across a wide network.

In view of the foregoing, it may be understood that there may be significant problems and shortcomings associated with traditional techniques for presenting deployment information on a graphical user interface.

SUMMARY OF THE DISCLOSURE

Techniques for presenting information on a graphical user interface are disclosed. In one embodiment, the techniques may be realized as a method for displaying information on a graphical user interface comprising displaying an endpoint interface via the graphical user interface on a display unit, determining whether an event mode for the endpoint interface has been selected, displaying the endpoint interface in the event mode when the event mode has been selected, determining whether an event has been detected, and displaying the detected event on the endpoint interface in the event mode when the event has been detected.

In accordance with other aspects of this embodiment, the endpoint interface includes a deployment map of endpoints deployed within a network.

In accordance with other aspects of this embodiment, the deployment map includes endpoint icons associated with the deployed endpoints in concentric rings.

In accordance with other aspects of this embodiment, the detected event is displayed on the endpoint interface in the event mode by highlighting an endpoint icon associated with an endpoint having the event detected thereon.

In accordance with other aspects of this embodiment, information about the event is displayed on the endpoint interface when the endpoint icon is selected.

In accordance with other aspects of this embodiment, the detected event is displayed on the endpoint interface in the event mode as a heat map overlaid with the endpoint icons.

In accordance with other aspects of this embodiment, the heat map indicates a severity of the detected event.

In accordance with other aspects of this embodiment, the method further includes determining whether a plurality of events have been detected, and comparing the plurality of events to determine whether the plurality of events are related.

In accordance with other aspects of this embodiment, the detected plurality of events are displayed on the endpoint interface overlaid with the deployment map, and wherein links between the plurality of events are displayed on the endpoint interface based on the comparison.

In accordance with other aspects of this embodiment, the endpoint interface indicates a severity of each of the detected plurality of events.

In accordance with other aspects of this embodiment, the event is caused by at least one of a computer virus executing on an endpoint, a malware application executing on the endpoint, and unauthorized activity of a user.

In accordance with other aspects of this embodiment, the method may further include implementing at least one remedial measure on at least one endpoint associated with the detected event.

In accordance with other aspects of this embodiment, the method may further include displaying a menu of the at least one remedial measure on the endpoint interface, and determining whether at least one of the remedial measures has been selected via the menu.

In accordance with other aspects of this embodiment, the remedial measure is at least one of quarantining the at least one endpoint, restricting network privileges for the at least one endpoint, restricting resource access for the at least one endpoint, quarantining an application implemented on the at least one endpoint, restricting network privileges for the application, and restricting resource access for the application.

In another embodiment, the techniques may be realized as a method for displaying information on a graphical user interface comprising tracking a plurality of events detected at least one endpoint deployed within a network, displaying an endpoint interface in an event mode via the graphical user interface on a display unit based on the tracked plurality of events, determining whether a historical view has been selected, generating a historical event view showing the plurality of events tracked occurring over time, displaying the historical event view on the display unit, and implementing at least one remedial measure in accordance with an input.

In accordance with other aspects of this embodiment, the historical event view is displayed with the tracked plurality of events as a heat map overlaid with the endpoint icons transitioning over time.

In accordance with other aspects of this embodiment, the method may further include comparing the plurality of events to determine whether the plurality of events are related.

In accordance with other aspects of this embodiment, the historical event view is displayed with the detected plurality of events overlaid with the deployment map, and wherein links between the plurality of events are displayed based on the comparison transitioning over time.

In another embodiment, the techniques may be realized as at least one non-transitory processor readable storage medium storing a computer program of instructions configured to be readable by at least one processor for instructing the at least one processor to execute a computer process for performing the method comprising displaying an endpoint interface via the graphical user interface on a display unit, determining whether an event mode for the endpoint interface has been selected, displaying the endpoint interface in the event mode when the event mode has been selected, determining whether an event has been detected, and displaying the detected event on the endpoint interface in the event mode when the event has been detected.

In another embodiment, the techniques may be realized as a system for presenting information on a graphical user interface comprising one or more processors communicatively coupled to a network; wherein the one or more processors are configured to display an endpoint interface via the graphical user interface on a display unit, determine whether an event mode for the endpoint interface has been selected, display the endpoint interface in the event mode when the event mode has been selected, determine whether an event has been detected, and display the detected event on the endpoint interface in the event mode when the event has been detected.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
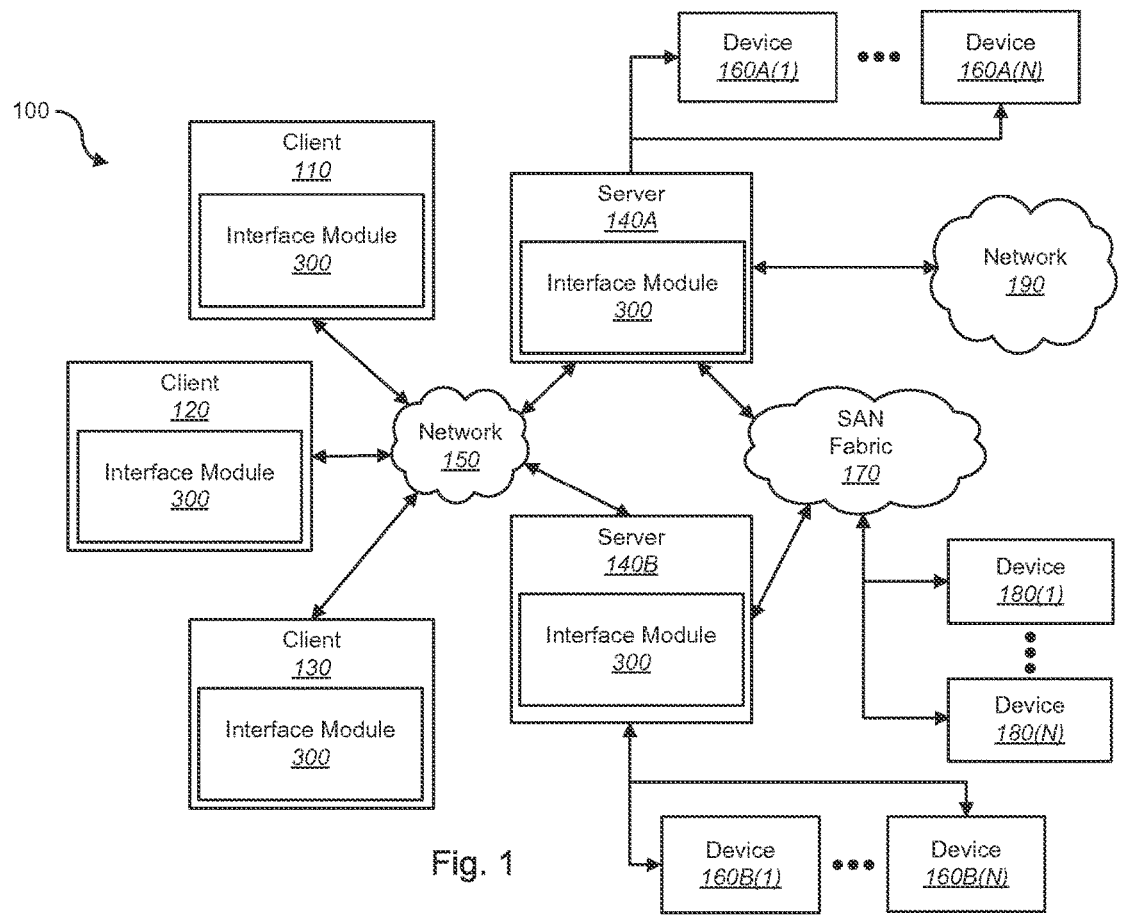
FIG. 1 shows a block diagram depicting a network architecture in accordance with an embodiment of the present disclosure.

FIG. 1 shows a block diagram depicting a network architecture 100 for presenting information on a graphical user interface in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain an interface module (e.g., interface module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
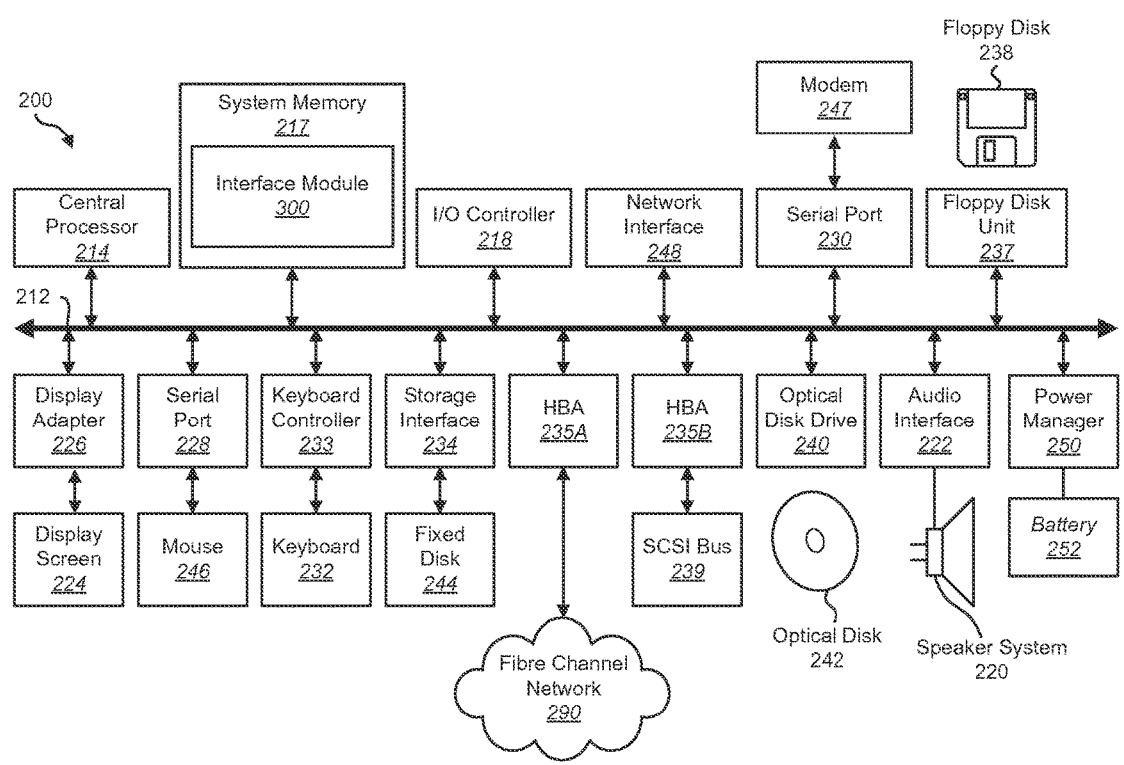
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may access information on servers 140A and 140B using, for example, interface module 300.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for storing web content such as for example, webpages.

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface. In some embodiments, clients 110, 120, and 130 may receive data from a user input via interface module 300. Additionally, clients 110, 120, and 130 may be implemented as endpoints within the network. Each client 110, 120, and 130 endpoint may have various software implemented thereon, policies applied thereto, and be associated with a particular user and/or group.

Each client 110, 120, and 130 endpoint may also report health statistics to severs 140A and 140B indicating whether an event was detected thereon such as malware or viruses. Each client 110, 120, and 130 endpoint may accordingly report statistics to severs 140A and 140B indicating various activity at the client such as installation of new software, implementation of new policies, health statistics, any suspicious or malicious activity, and any other activity useful for an administrator to monitor.

Servers 140A and 140B may be application servers, web servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. Servers 140A and 140B may also be hosts, such as web servers, to provide web content to clients.

According to some embodiments, servers 140A and 140B may be platforms used controlling and monitoring endpoints (e.g., clients 110, 120, and 130) within the network. For instance, servers 140A and 140B may control which software is implemented on particular endpoints, which policies are assigned to endpoints, which users are associated with particular endpoints, and additional aspects in relation to implementation of endpoints within the network. Furthermore, servers 140A and 140B may monitor the endpoints for events such as outbreaks of malware or viruses on the endpoint. Servers 140A and 140B may also track such events over time. Servers 140A and 140B may also display those events occurring at the endpoints to an administrator or user to allow the administrator or user to take appropriate action to with respect to the endpoints. Accordingly, servers 140A and 140B may contain one or more portions of software for accessing content via a graphical user interface such as, for example, interface module 300.

According to some embodiments, clients 110, 120, and 130 may contain one or more portions of software for accessing content via a graphical user interface such as, for example, interface module 300. As illustrated, one or more portions of the interface module 300 may reside at a network centric location. According to some embodiments, network 190 may be an external network (e.g., the Internet) and server 140A may be a gateway or firewall between one or more internal components and clients and the external network. According to some embodiments, the interface module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g., RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the interface module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
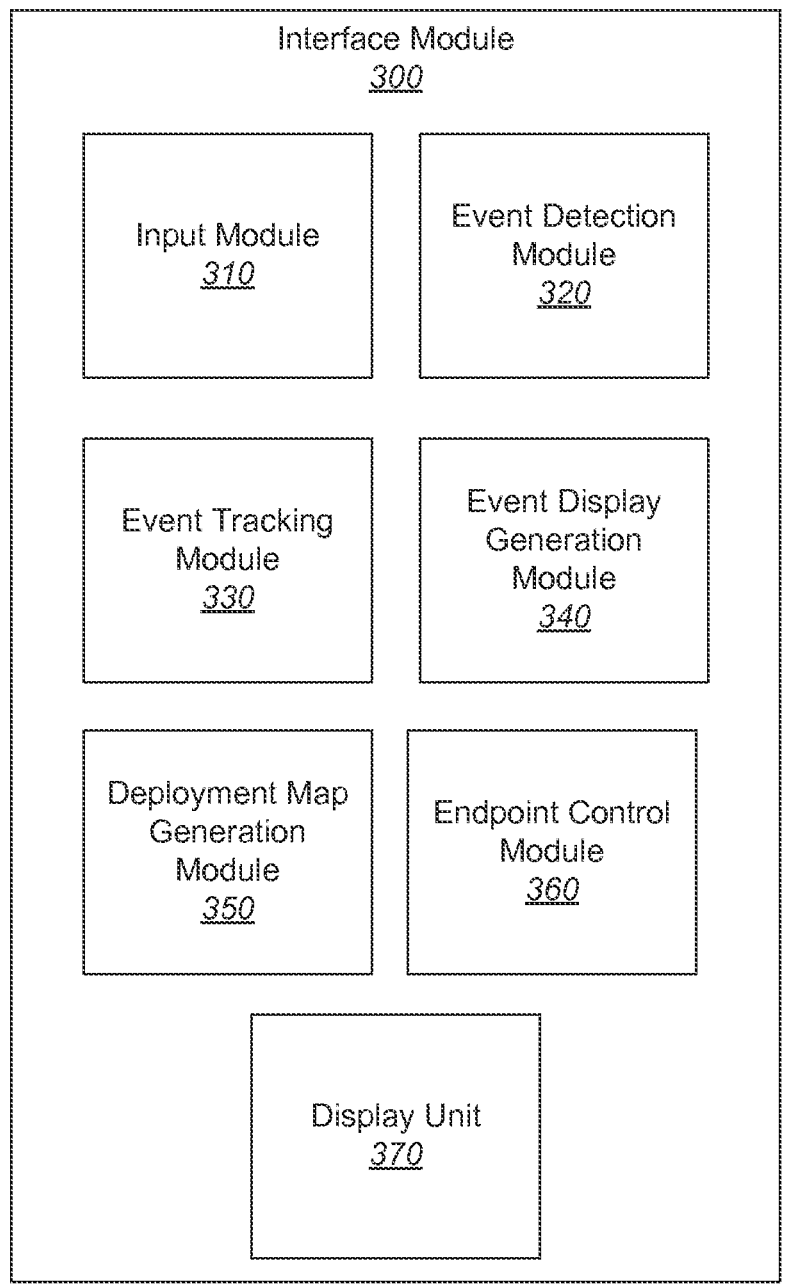
FIG. 3 shows an interface module in accordance with an embodiment of the present disclosure.

FIG. 3 shows an interface module 300 in accordance with an embodiment of the present disclosure. As illustrated, the interface module 300 may contain one or more components including an input module 310, an event detection module 320, an event tracking module 330, an event display generation module 340, a deployment map generation module 350, an endpoint control module 360, and a display unit 370.

The input module 310 may receive an input from a user. In some instances, the input may be received from a user via a I/O device such as a keyboard and/or mouse. In other instances, the input may be received from a user via a touchscreen (e.g., capacitive touchscreen). The input module 310 may also determine a type of input received. For example, it may be determined whether an input received is a selection of an endpoint, a plurality of endpoints, a text search, selection of a group of endpoints, selection of an implemented policy, a change in view of endpoints, a zoom in or zoom out view, or any other additional input.

The event detection module 320 may monitor each endpoint in a network. In some embodiments, the endpoint detection module 320 may monitor various aspects of each endpoint within the network such as users associated with the endpoints, software implemented on the endpoints, policies implemented on the endpoints, and group associations. Additionally, the event detection module 320 may monitor health statistics and behavior or each endpoint within the network.

In some embodiments, a portion of the event detection module 320 may be implemented on each endpoint as a security agent to monitor various types of behavior on the endpoint. For instance, the security agent at each endpoint may monitor its behavior for any malicious activity that may be caused by malware or viruses that have infected the endpoint. For example, an endpoint security agent may monitor for events such as unauthorized system directory access, unauthorized directory changes, unauthorized writing to an operating system, termination of security applications such as anti-virus applications, any malicious network activity, or any other activity that is not normally exhibited by an endpoint or a user. A security agent implemented on an endpoint in some instances may utilize heuristics to monitor the behavior to identify specific risky or suspicious behavior. Such a security agent may report detected behavior to the event tracking module 330 at regular intervals which may be varied depending on the activity at the client, continuously, or upon the occurrence of a particular behavior or activity at a client.

The event tracking module 330 may monitor each endpoint over time to track changes to each endpoint. Additionally, the event tracking module 330 may maintain a profile for each endpoint with the network. In some instances, the behavior detected by the event detection module 320 may specify particular information about the suspicious or malicious behavior and provide that information to the event tracking module 330. For example, the event detection module 320 may identify which applications are being executed or are running on an endpoint and any behavior associated with the particular applications. Further, the information may include behavior information of the overall client, previously existing applications or processes, any new applications, and any combination of information useful in determining whether an application or process is exhibiting suspicious behavior.

Based on the information detected at each endpoint, the event tracking module 330 may track any events that occur at each endpoint over time. In some instances, the event tracking module 330 may store this information at a backend server site (e.g., server 140A). In other instances, the event tracking module 330 may store this information locally at each respective endpoint client (e.g., clients 110, 120, and 130). Additionally, the event tracking module 330 may log or associate each event with the system information reported by the event detection module 320 and described above. Further, the event tracking module 330 may analyze the tracked events by comparing the events across various endpoints to determine whether the events are related. For example, the event tracking module 330 may compare aspects of an event (e.g., application triggering event) at a first endpoint to aspects of an event at a second endpoint to determine whether they are related.

The event display generation module 340 may generate a visualization of the event information detected by the event detection module 320 and tracked by the event tracking module 330. In some instances, the event display generation module 340 may highlight or flag endpoints within a deployment map that have detected an event. An example of this is described below and shown in FIG. 10. In other instances, the event display generation module 340 may generate a heat map of events across the network. An example of this is described below and shown in FIG. 11. Further, the event display generation module 340 may generate a visualization of the events by displaying links to similar events that occur at different endpoints. Such a visualization may assist an administrator to determine how an outbreak of a particular virus or malware is occurring within the network and how to remedy the problems caused by the virus or malware. An example of this is described below and shown in FIG. 12.

The deployment map generation module 350 may generate a map of each endpoint or a subset of endpoints within the network. In some embodiments, the deployment map generation module 350 may generate the map of endpoints based on an input received via the input module 310. Instances of the deployment map generated by the deployment map generation module 350 are described below with respect to FIG. 6-12.

The endpoint control module 360 may implement any change made to one or a plurality of endpoints. In some embodiments, upon a detection of an event such as a virus or malware infection, an administrator may control various aspects of an endpoint to mitigate potential damage caused by a virus or malware on that endpoint. Additionally, an administrator may modify permissions of an endpoint or user as a whole or may modify privileges of particular applications at an endpoint. For example, an administrator may modify network permissions for a particular endpoint, modify user permissions, quarantine an entire endpoint or only certain applications on an endpoint, restrict database access for a particular endpoint, user, or application, or any other appropriate remedial measures.

In order to enable an administrator to take such remedial measures, the endpoint control module 360 may generate a menu of options to be displayed with the deployment map and the event display. In some embodiments, the menu of options may be displayed concurrently with the deployment map based on an input received from a user or administrator via the input module 310. Accordingly, the menu of options may be used by an administrator to control at least one endpoint and/or user within the network.

The display unit 370 may display the deployment map generated by the deployment map generation module 350. The display unit 370 may display the visualization of the event information generated by the event display generation module 340. Additionally, the display unit 370 may display the menus generated by the endpoint control module 360. The display unit 370 may also display any information associated with the endpoints from the endpoint monitoring module 330 and may receive an input from a user or administrator via the input module 310. In some embodiments, the display unit 370 may be a touchscreen that may receive a user input. The display unit 370 may also provide a user or administrator with an interface to control any aspect to the processes described below.

Figure 4:
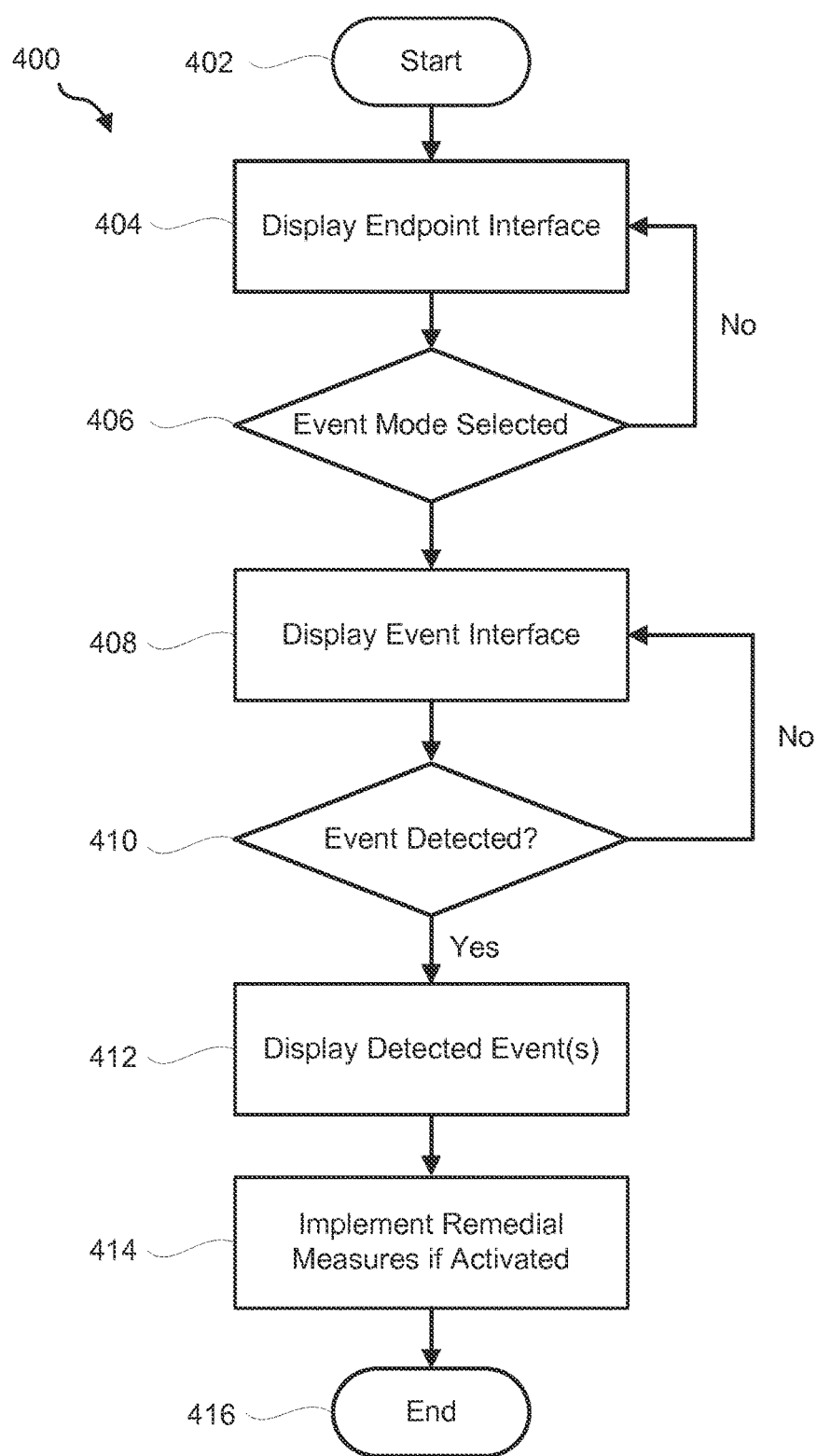
FIG. 4 shows a method for displaying content on a graphical user interface in accordance with an embodiment of the present disclosure.

FIG. 4 shows a method 400 implementing a graphical user interface in accordance with an embodiment of the present disclosure. The method 400 may be performed on any one of clients 110, 120, and 130, and servers 140A and 140B at any time. At block 402, the method 400 may begin.

At block 404, an endpoint interface may be displayed. In some embodiments, the endpoint interface may include a deployment map generated by the deployment map generation module 350. In some instances, the deployment map may be displayed and viewable by a user via the display unit 370. The endpoint interface may display any number of endpoints and/or users as described below with respect to FIGS. 6-12. Additionally, the endpoint interface may display aspects of the endpoints as described below with respect to FIGS. 6-12. After the endpoint interface has been displayed, the overall process may then proceed to block 406.

At block 406, it may be determined whether an input selecting an event mode has been received. In some embodiments, the determination of whether a selection of an event mode may be performed by the input module 310. In at least one embodiment, an input may be received from a user or administrator via an I/O device such as a keyboard or a mouse. In other instances an input may be received from a user or administrator via a touchscreen using their finger or a stylus. When it is determined that an event mode has not been detected, the process may proceed back to block 404. However, when it is determined that an event mode has been selected, the overall process may proceed to block 408.

At block 408, the endpoint interface displayed at block 404 may be updated to display an event interface in accordance with the event mode selected at block 406. In some instances, the endpoint interface may be updated in accordance with a visualization of the event information generated by the event display generation module 340 to display the event interface. After the event interface has been displayed, the overall process may proceed to block 410.

At block 410, it may be determined whether an event has been detected. In some embodiments, the determination of whether an event has been detected may be performed by the event detection module 330. When it is determined that no events have been detected, the process may proceed back to block 410 along with an indication that no events have been detected. However, if it is determined that at least one event has been detected across the network, the overall process may proceed to block 412.

Figure 10:
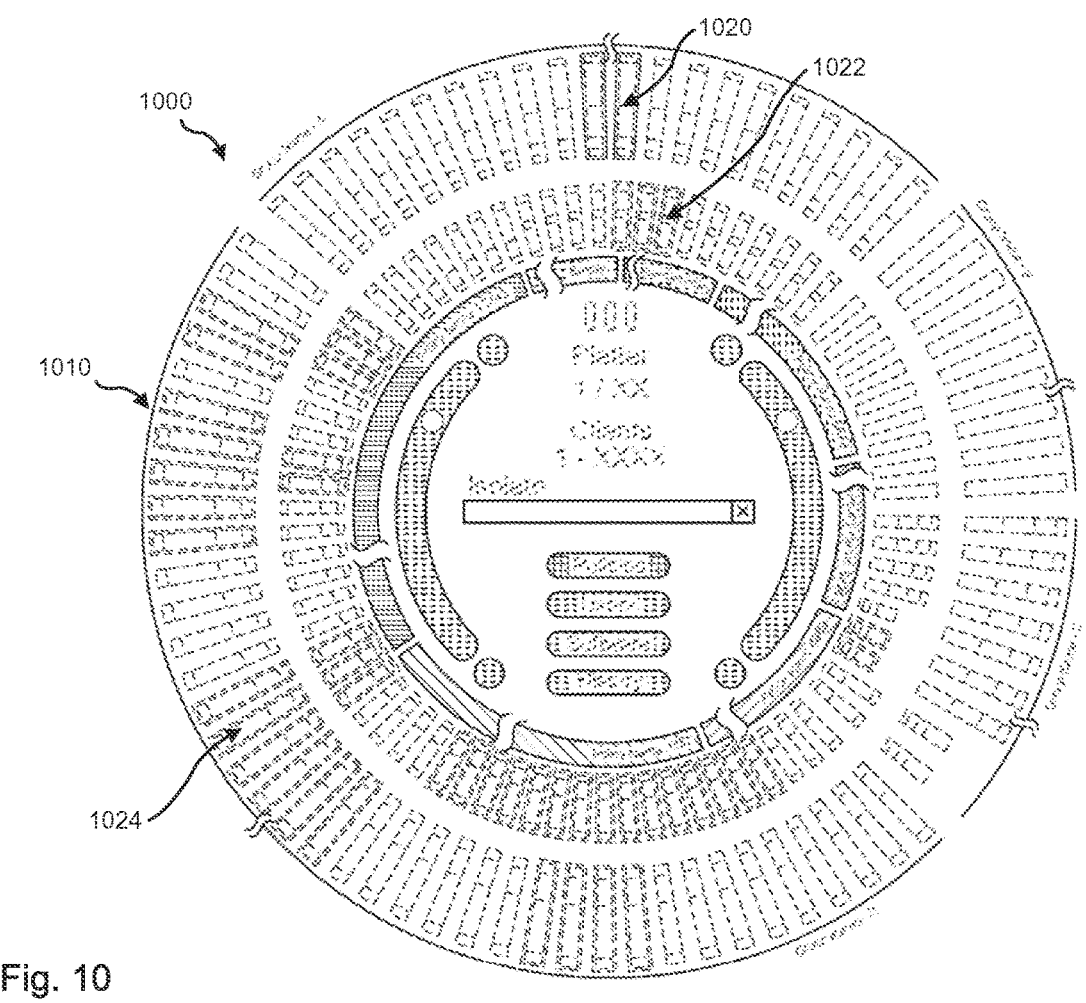
FIG. 10 shows a graphical user interface in accordance with an embodiment of the present disclosure.
Figure 11:
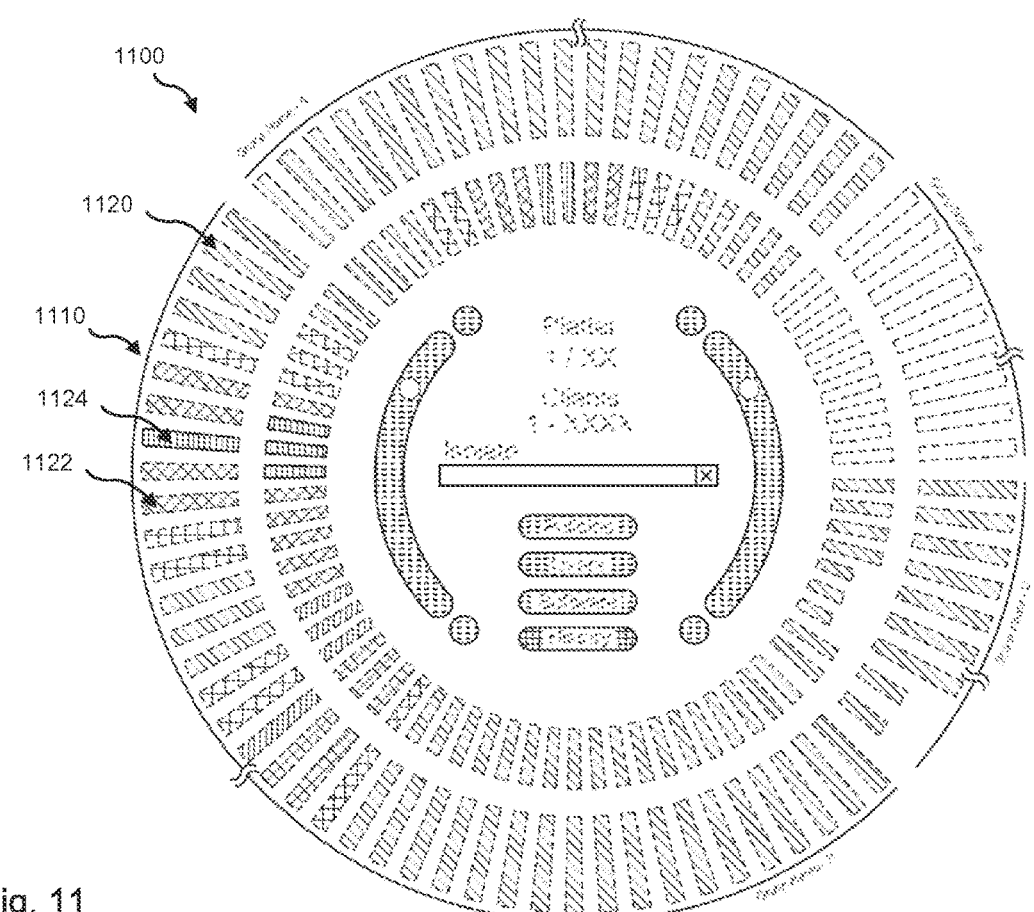
FIG. 11 shows a graphical user interface in accordance with an embodiment of the present disclosure.

At block 412, a visualization of the detected event(s) may be displayed. In some embodiments, the visualization of the event(s) may be generated by the event display generation module 340. In some instances, the visualization of the event information may be overlaid with the deployment map. The visualization may be a highlighting of flagging of endpoints having detected events as shown in FIG. 10. Additionally, the visualization may be a heat map of events across the endpoints as shown in FIG. 11. After the visualization of the detected event(s) has been displayed, the overall process may proceed to block 414.

At block 414, appropriate remedial measures may be activated with respect to at least one endpoint. In some embodiments, the remedial measures may be implemented by the endpoint control module 360. The remedial measures may be any appropriate action in response to a detection of an event at an endpoint. For instance, the remedial measures may include quarantining an endpoint, restricting network or database access for an endpoint, quarantining an application implemented on an endpoint, restricting user privileges, or any other appropriate remedial measure. However, remedial measures may not be necessary depending on the detected event. For example, the detected event may indicate suspicious but not malicious activity. Accordingly, an administrator may not wish to take such remedial actions at that time. The overall process 400 may periodically or continuously.

Figure 5:
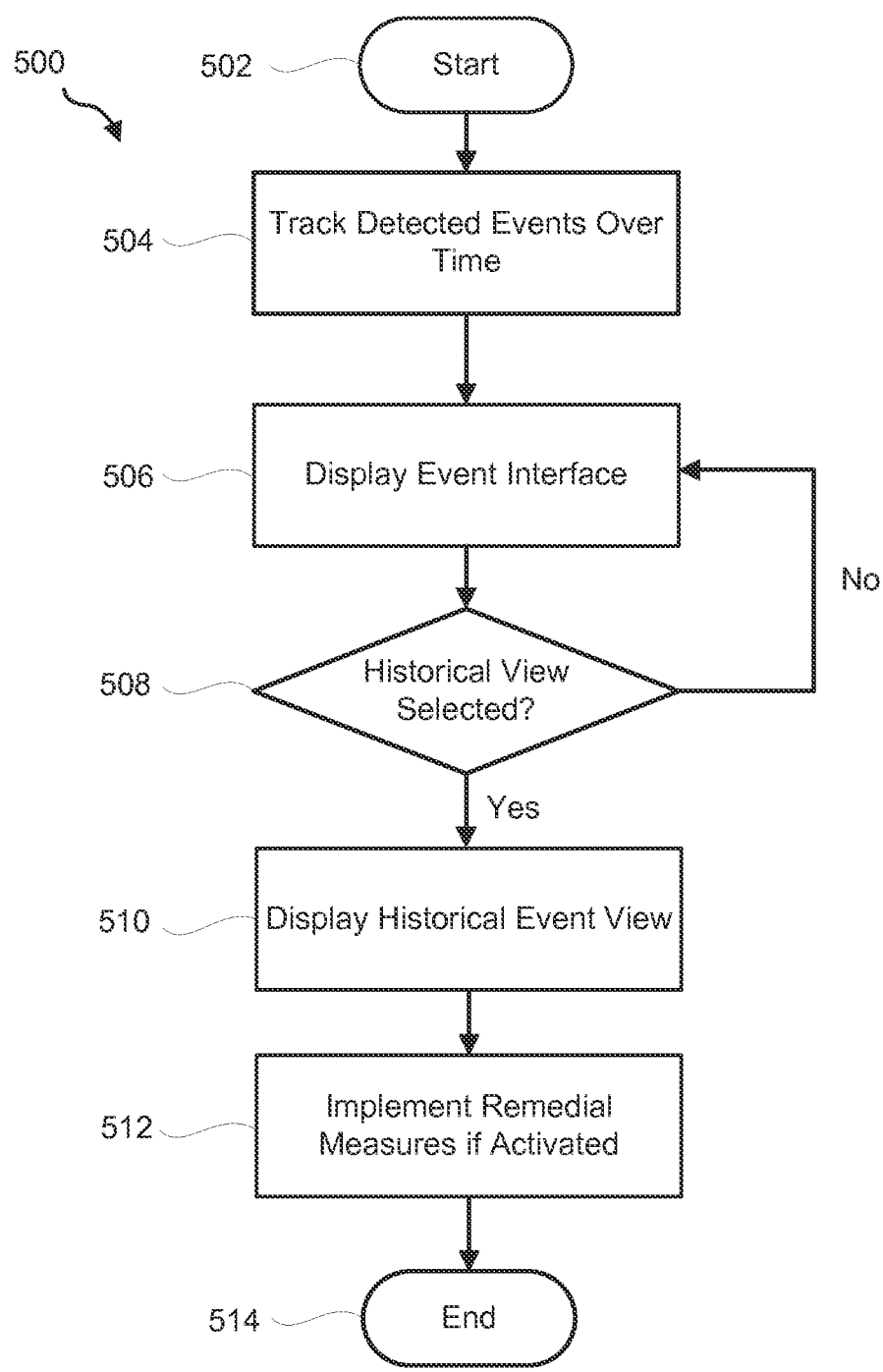
FIG. 5 shows a method for displaying content on a graphical user interface in accordance with an embodiment of the present disclosure.

FIG. 5 shows a method 500 for implementing a graphical user interface in accordance with an embodiment of the present disclosure. The method 500 may be performed on any one of clients 110, 120, and 130, and servers 140A and 140B. At block 502, the method 500 may begin.

At block 504, events may be tracked over time. In some embodiments, the events may be tracked by the event tracking module 330. In some embodiments, the event tracking module 330 may track events over time. Events occurring across endpoints within the network may be tracked over time to assist an administrator in determine how outbreaks of malicious or suspicious activity are occurring across the network. In some instances, a profile may be maintained for each endpoint within the network and record any information about the endpoint in relation to an event.

The tracked information may be used to determine whether particular events occurring may be linked. For instance, an event having occurred a first endpoint may be compared to an event having occurred at a second endpoint to determine whether they are caused by the same virus or malicious application. After at least one event has tracked over time, the overall process may proceed to block 506.

At block 506, an event interface may be displayed. In some instances, the event interface may be display on the display unit 370. The event interface may be similar to the event interface described above with respect to FIG. 4. After the event interface has been displayed, the overall process may proceed to block 508.

At block 508, it may be determined whether a historical view has been selected. In some embodiments, the event interface may display a historical view icon for selection by a user or administrator via the display unit 370. When it has been determined that the historical view has not been selected, the overall process may proceed back to block 506. However, when it has been determined that the historical view has been selected, the overall process may proceed to block 510.

At block 510, a historical event view may be displayed. In some embodiments, the historical event view be generated by the event display generation module 340 to display an occurrence of events across at least one endpoint deployed within the network on the event interface over time on the display unit 370. For example, the historical event view may initially display the event interface at a first time without any events have occurred at any of the displayed endpoints, the historical event view may then display a first event at a first endpoint occurring at a first time, and then a second event at a second endpoint occurring at a second time. In some instance, the events may be displayed by highlighting or flagging endpoints at which an event has occurred. In other embodiments, the events may be displayed as a heat map or points linking various events as they change over time. Accordingly, a user or administrator may easily recognize how events are occurring across the network over time. When the historical event view has been displayed, the overall process may proceed to block 512.

At block 512, appropriate remedial measures may be activated with respect to at least one endpoint. In some embodiments, the remedial measures may be implemented by the endpoint control module 360. The remedial measures may be any appropriate action in response to a detection of an event at an endpoint. For instance, the remedial measures may include quarantining an endpoint, restricting network or database access for an endpoint, quarantining an application implemented on an endpoint, restricting user privileges, or any other appropriate remedial measure. However, remedial measures may not be necessary depending on the detected event. For example, the detected event may indicate suspicious but not malicious activity. Accordingly, an administrator may not wish to take such remedial actions at that time. The overall process 500 may repeat periodically or continuously.

Figure 6:
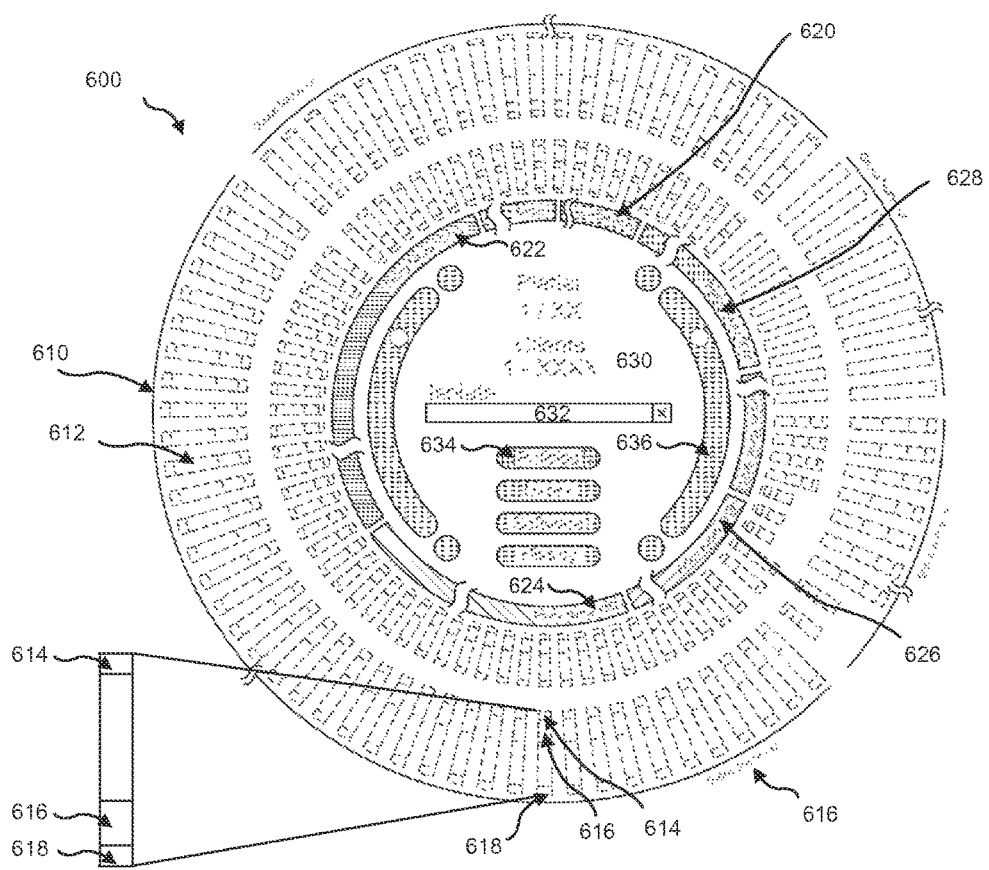
FIG. 6 shows a graphical user interface in accordance with an embodiment of the present disclosure.

FIG. 6 shows a graphical user interface 600 in accordance with an embodiment of the present disclosure. In some embodiments, the graphical user interface 600 may display an endpoint deployment map via display unit 370. The interface 600 may have a plurality of regions or areas displaying different information in a variety of formats. For instance, the interface 600 may have a circular arrangement with a central portion 630 and an outer portion 610 for displaying information about deployment across a network. For example, the interface 600 may display endpoints such as clients within the network, users within the network, or any other device, component or deployment within the network. FIG. 6 shows one instance of an interface 600 having two rings of endpoints. However, the interface 600 is not limited to two rings and may show and number of concentric rings extending away from a center of the interface 600.

In some embodiments, the interface 600 may display a plurality of endpoints organized together as groups in an outer region 610. For instance, an administrator may group certain endpoints into network groups according to location, department, or any other known factor, and the interface may accordingly display those endpoints together as shown in outer region 610. Within outer region 610, the plurality of endpoints associated with the group may be displayed in a radial pattern extending away from the central region 630.

In some embodiments, the endpoints may be represented as icons 612 within the outer region 610. Each icon may correspond to a single endpoint, a plurality of endpoints, a single user, a plurality of users, or software implemented within the network. Additionally, each icon may indicate various aspects of the endpoint(s) within that particular group (e.g., Group A). In some instances, the icons 612 may include predetermined segments for indicating the various aspects of the endpoint(s) such as a type of device associated with the endpoint(s). For example, the endpoint may be a desktop client, a laptop client, a mobile device such as a cell phone, a tablet, a server, or any other device deployed within the network. To easily indicate the device type of the endpoint, a first segment 618 of the icon 612 may be highlighted a particular color (e.g., red for desktop client, blue for mobile device, etc.).

The endpoint icons 612 may further indicate policies implemented on the endpoints. To easily indicate the policies implemented the endpoint(s), a second segment 616 of the icon 612 may be highlighted a particular color for a first policy and a third segment 614 of the icon 612 may be highlighted a particular color for a second policy. For example, antivirus policies may have a green color while firewall policies may have an orange color. In some embodiments, the second segment 616 may be associated with a first type of policy while the third segment 614 may be associated with a second type of policy. FIG. 6 further shows a close up view of an example of an icon 612 with the segments 614, 616, and 618. Accordingly, an administrator may easily visualize various device types and policies implemented across the endpoints deployed within the network.

The interface 600 may be constantly updated in accordance with any changes to endpoints. For instance, if an endpoint is no longer associated with a first group but is now associated with another group displayed on the interface 600, the interface 600 may by dynamically updated to reflect this change in group association. Additionally, when a policy applied to an endpoint has changed, the interface 600 may update the icon 612 associated with the endpoint to reflect the change.

The interface 600 may further provide a middle region 620 between the outer region 610 and the central region 630. In the middle region 620, the various policies associated with the endpoints displayed in the outer region 610 may be displayed. For example, when multiple policies have been implemented on the endpoints within the groups (e.g., Group A, Group B, etc.) displayed in the outer region 610, corresponding policy icons 622 may be displayed in the middle region 620. In some embodiments, the policy icons 622/624/626/628 may be displayed in a matching color to the policy shown on the icon 612.

Additionally, the policy icons 622/624/626/628 may be displayed in a ring format such that each policy icon 622/624/626/628 may have a length that corresponds to the number of endpoints having the policy implemented thereon. For example, when a first policy associated with policy icon 622 is implemented on more endpoints than a second policy associated with policy icon 624, the length of policy icon 622 in the middle region 620 may be longer than the length of policy icon 624. Each of the policy icons 622/624/626/628 may be selected as described below with respect to FIG. 11. Accordingly, an administrator may easily recognize common policies implemented across the endpoints within the network.

In the central region 630 of the interface 600, various tools are provide to enable a user or administrator to manipulate the interface 600. In some embodiments, the central region 630 may include a text search box 632. The text search box 632 may enable a user or administrator to search through the endpoints, users, or software based on any variety of set parameters. For example, an administrator may input a particular user name (e.g., John Doe) into the text box 632 and the endpoint(s) associated with the particular user name may be displayed and/or highlighted in the outer region 610. Alternatively, an administrator may input a particular software name into the text box 632 and the endpoint(s) having the software installed thereon may be displayed and/or highlighted in the outer region 610. The text search is not limited to user names and software and may be any number of various endpoint aspects established by an administrator (e.g., group, location, department, device type, operating system, etc.)

The central region 630 may further provide selectable visualization mode icons 634. Upon selection of one of the visualization mode icons 634, the information displayed in the outer region 610 may be changed. For example, when a policies mode icon is selected, policies associated with the various endpoints may be displayed in the outer region 610. Alternatively, when a users mode icon is selected, user information associated with the various endpoints may be displayed in the outer region 610. Additionally, when a software mode icon is selected, software information associated with the various endpoints may be displayed in the outer region. Further, when a history mode icon is selected, event information associated with the various endpoints may be displayed in the outer region 610. In some embodiments, the event information may be associated with an outbreak of malware or viruses across the network as described below.

The central region 630 may additionally provide sliders 636 to view various subsets of endpoint clients within the network. In some instances, the outer region 610 may display information on a subset of endpoint clients within a larger network. These subsets of endpoint clients may be arranged in views known as platters. For example, the outer region 610 of platter 1 of 10 may display information on 100 endpoint clients (e.g., 1-100) out of a total of 1000 endpoint clients at one time. To view a different subset of endpoint clients, an administrator or user may manipulate sliders 636 to shift between different platters or subsets of endpoint clients (e.g., platter 5 showing endpoint clients 501-600). Additionally, the central region 630 may indicate which of the platters and endpoints are currently being displayed out of the total number of platters and endpoints in the network (e.g., Platter 1/10 and Clients 1-100). Accordingly, a user or administrator may easily view the endpoints deployed across the network.

Figure 7:
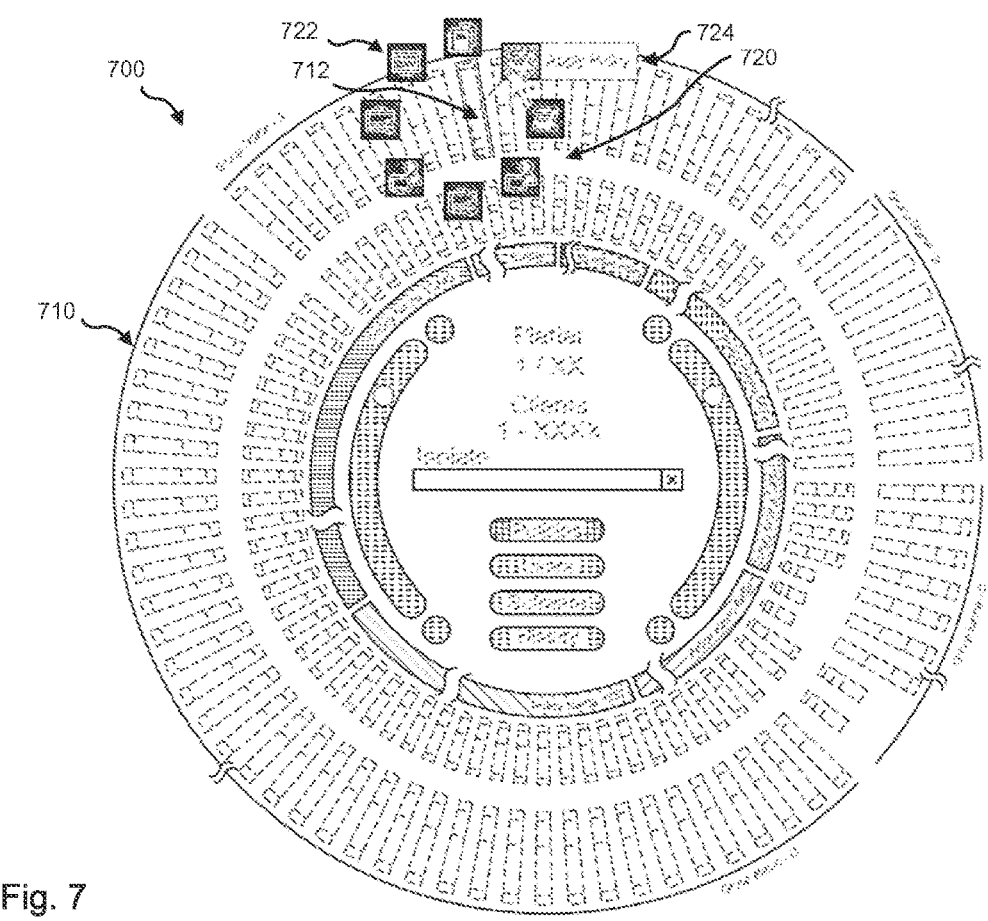
FIG. 7 shows a graphical user interface in accordance with an embodiment of the present disclosure.

FIG. 7 shows a graphical user interface 700 in accordance with an embodiment of the present disclosure. In some embodiments, the graphical user interface 700 may display an endpoint deployment map via display unit 370. A user or administrator may select any one endpoint displayed in an outer region 710 of the interface 700. Upon selection of the single endpoint 712, the interface 700 may also provide a menu of options with respect to the selected endpoint 712.

The menu of options 720 may be used by a user or administrator to control or modify aspects of the selected endpoint 712 such as applying a policy or editing a previously applied policy, performing maintenance, implementing new software privileges or modifying previous software privileges, or controlling a variety of other aspects relevant to the endpoints. Additionally, the menu of options 720 may provide a user or administrator with the ability to monitor health statistics of the selected endpoint. For instance, upon selection of an icon 722, health statistics of the selected endpoint including any events detected thereon may be displayed.

In some embodiments, the menu of options 720 may be displayed in a ring of selectable icons 722 around the selected endpoint 712. Upon selection of one of the menu icons 722, an additional window 724 may be displayed in relation to the selected menu icon 722. The additional window 724 may display additional information for controlling or monitoring the selected endpoint. For instance, the additional window 724 may display details of event information detected at endpoint 712.

Figure 8:
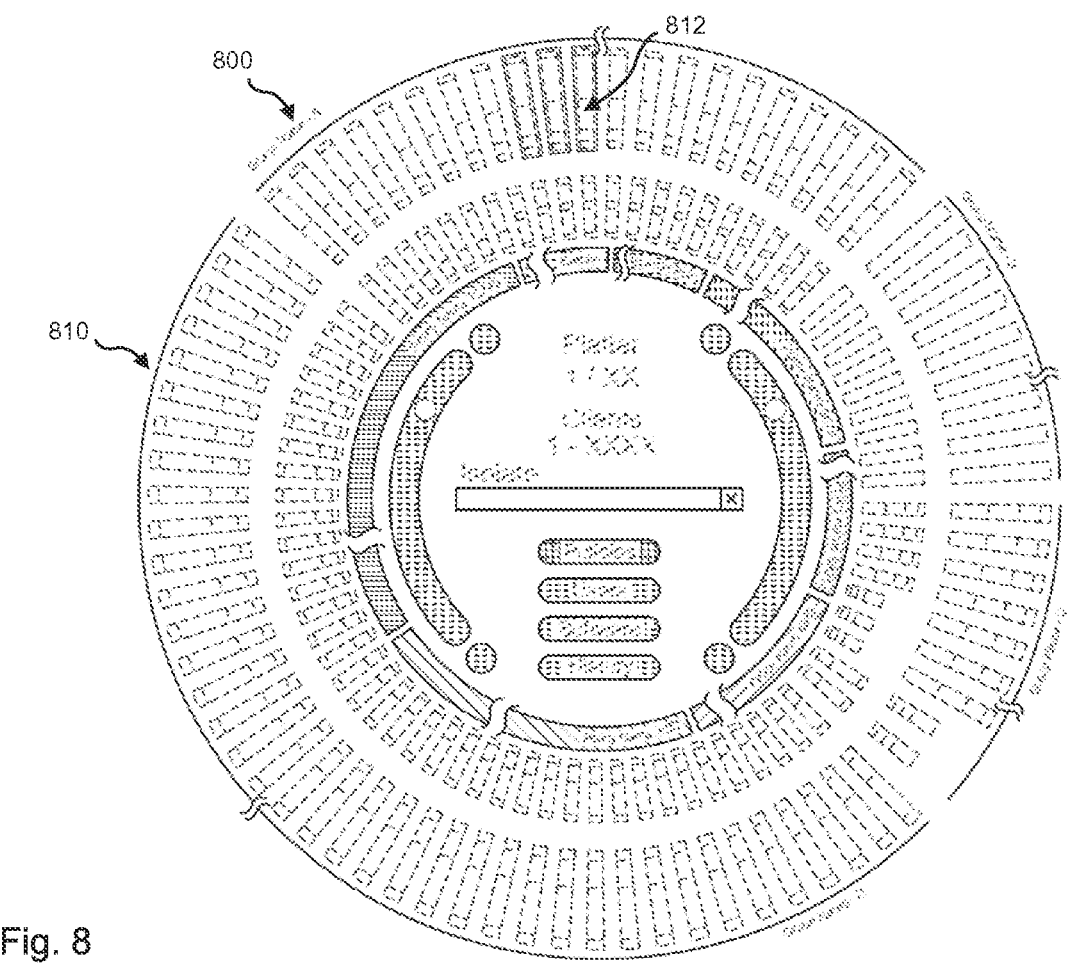
FIG. 8 shows a graphical user interface in accordance with an embodiment of the present disclosure.

When a user selects multiple endpoints, the interface shown in FIG. 8 may be displayed. In some embodiments, the display may transition from the interface of FIG. 7 to the interface of FIG. 8. However, the display may also transition to the interface of FIG. 8 from any other the other interfaces described herein.

FIG. 8 shows a graphical user interface 800 in accordance with an embodiment of the present disclosure. In some embodiments, the graphical user interface 800 may display an endpoint deployment map via display unit 370. The interface 800 may also provide a user or administrator with the ability to select multiple endpoints in an outer region 810.

The selection of multiple endpoints may be performed by individually selecting a plurality of endpoints in some instances. In one embodiment, the multiple endpoints may be selected by a user or administrator using an I/O device such as a mouse and keyboard or via a touchscreen interface. For instance, a user or administrator may select a first endpoint, hold a predetermined key on a keyboard (e.g., the shift key), and select additional endpoints. In other instances, a user or administrator may draw an outline around endpoints desired to be selected via an I/O device or via a touchscreen. In additional instances, a user or administrator may select a first endpoint and based on a specific aspect of the first endpoint, additional endpoints sharing that aspect may then be automatically selected. In some embodiments, after selecting a plurality of endpoints, a user or administrator may create a new group or subgroup and add those selected endpoints to that group.

Figure 9:
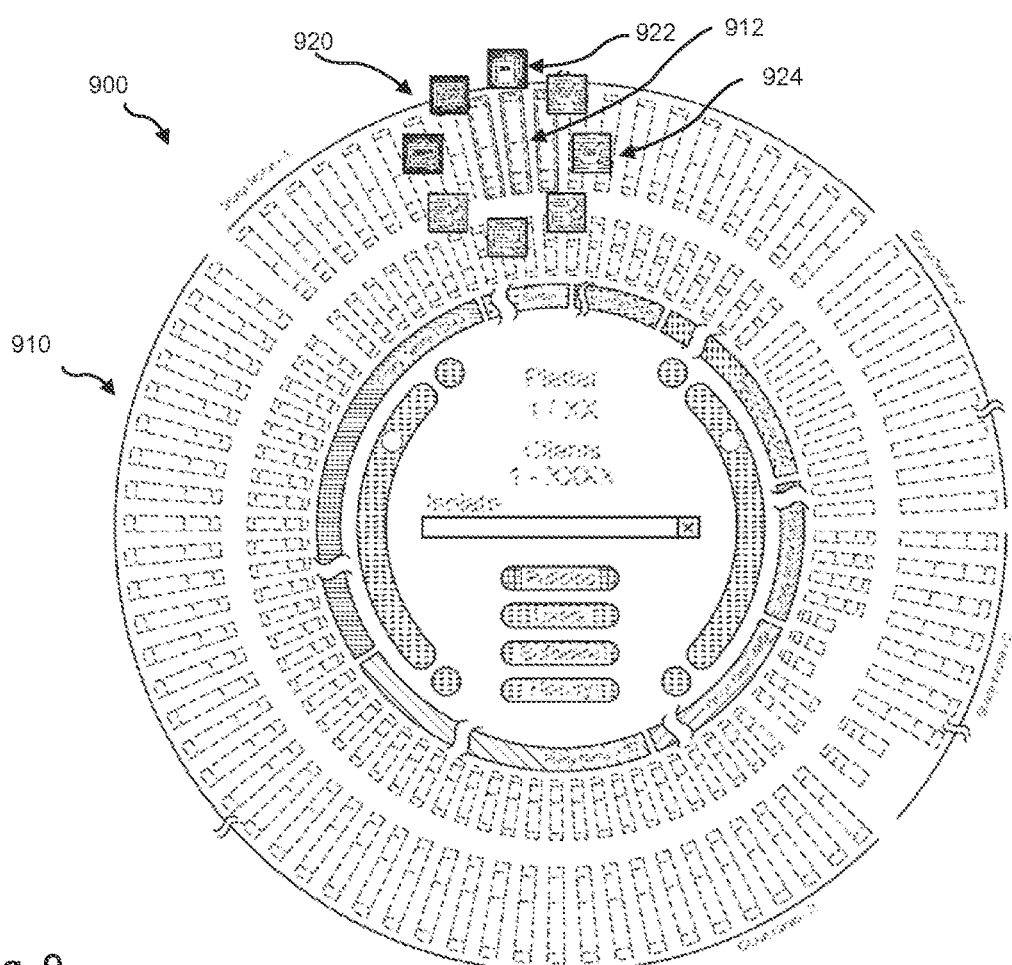
FIG. 9 shows a graphical user interface in accordance with an embodiment of the present disclosure.

When a menu is activated after selecting multiple endpoints, the interface shown in FIG. 9 may be displayed. In some embodiments, the display may transition from the interface of FIG. 8 to the interface of FIG. 9.

FIG. 9 shows a graphical user interface 900 in accordance with an embodiment of the present disclosure. In some embodiments, the graphical user interface 900 may display an endpoint deployment map via display unit 370. As described above with respect to FIG. 8, a user or administrator may select a plurality endpoints displayed in an outer region 810/910 of the interface 800/900. Upon selection of a plurality of endpoints 912, the interface 900 may also provide a menu of options 920 with respect to the selected endpoints 912. In some instances, the menu of options 920 for the selected endpoints may be similar to the menu of options 720 for a single selected endpoint described above.

The menu of options 920 may be used by a user or administrator to control or modify aspects of the selected endpoints 912 such as applying a policy or editing a previously applied policy, performing maintenance, implementing new software privileges or modifying previous software privileges, or controlling a variety of other aspects relevant to the endpoints. Additionally, the menu of options 920 may be used to track health statistics and view information about events for the selected endpoints 912. In some embodiments, the menu of options 1020 may be displayed in a ring of selectable icons 1022 around at least one of the selected endpoints 912.

The available options in the menu 920 may vary depending on the relationships between the endpoints selected. For example, when the selected endpoints have common properties (e.g., policies), those properties may be modified across all of the endpoints. However, when the selected endpoints do not have a specific common property (e.g., common user), then the menu option to modify aspects of that property (e.g., user rights) may not be available in menu 920.

When a user or administrator activates an event mode identifying problem endpoints, the interface shown in FIG. 10 may be displayed. In some embodiments, the display may transition from the interface of FIG. 9 to the interface of FIG. 10. However, the display may also transition to the interface of FIG. 10 from any other the other interfaces described herein.

FIG. 10 shows a graphical user interface 1000 in accordance with an embodiment of the present disclosure. In some embodiments, the graphical user interface 1000 may display an endpoint deployment map via display unit 370. The interface 1000 may display endpoints with an event having occurred thereon.

The event may be detected by the event detection module 320. Based on the event(s) detected by the event detection module 320, the interface 1000 may display information indicating which endpoints (e.g., 1020/1022/1024) are associated with an event. In some instances, the endpoints (e.g., 1020/1022/1024) associated with an event may be highlighted, bolded, or flagged to visually indicate to a user or administrator that those endpoints are associated with events. A user or administrator may also select any of the endpoints shown in interface 1000 as described above with respect to FIGS. 7 and 9 and implement remedial measures if necessary. In some embodiments, the interface 1000 may depict a real-time view of events occurring across the network. Accordingly, as new events are detected, additional endpoints may be flagged while endpoints having resolved problems may be unflagged.

In some embodiments, the display may transition from the interface of FIG. 10 to the interface of FIG. 11. However, the display may also transition to the interface of FIG. 11 from any other the other interfaces described herein.

FIG. 11 shows a graphical user interface 1100 in accordance with an embodiment of the present disclosure. In some embodiments, the graphical user interface 1100 may display an endpoint deployment map via display unit 370. The interface 1100 may display a heat map of events occurring across endpoints on the deployment map. For example, the interface 1100 may display the endpoints in an outer region 1110 with each endpoint indicating whether it is associated with an event or a plurality of events by assigning each endpoint a color coding. In some instances, the interface 1100 may depict a real-time view of events occurring across the network as a heat map that is constantly updated to reflect a current state of events occurring across the network. In other instances, the interface 1100 may display a heat map that changes over a historical period to illustrate events occurring across the network.

In at least one example, the interface 1000 may illustrate a first endpoint 1120 as not being associated with any event, a second endpoint 1122 being associated with one event, and a third endpoint 1124 being associated with a plurality of events. In some instances, the first endpoint 1120 may be display in a green color, the second endpoint 1122 may be displayed in a yellow color, and the third endpoint 1124 may be displayed in a red color. Additionally, the interface 1000 may display the endpoints in the outer region 1110 in accordance with a severity of detected events.

For example, an endpoint with a single catastrophic event may be displayed in a deep red color while an endpoint with a plurality of suspicious but not malicious events may be displayed in a yellow color. Accordingly, a user or administrator may be able to easily recognize where concentrations of event activity in relationship to other endpoints within a group. A user or administrator may also select any of the endpoints shown in interface 1000 as described above with respect to FIGS. 7 and 9 and implement remedial measures if necessary.

Figure 12:
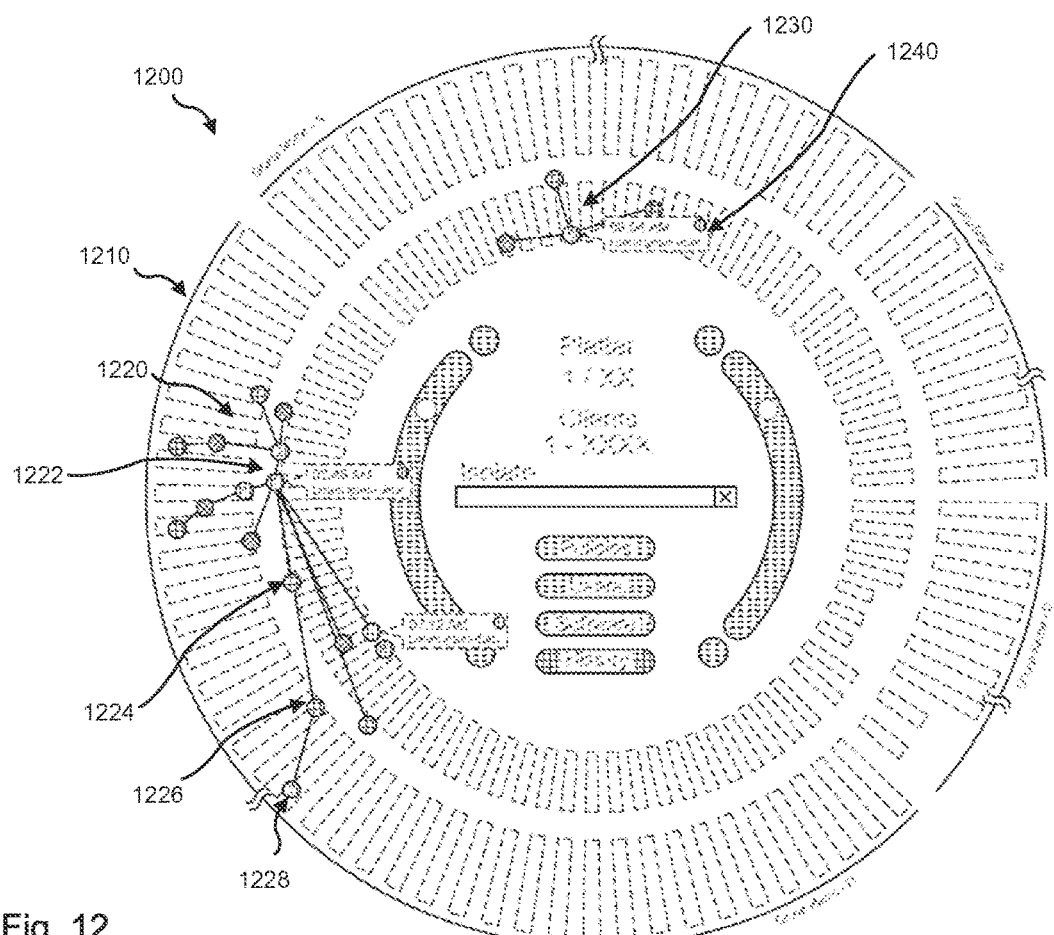
FIG. 12 shows a graphical user interface in accordance with an embodiment of the present disclosure.

In some embodiments, the display may transition from the interface of FIG. 11 to the interface of FIG. 12. However, the display may also transition to the interface of FIG. 12 from any other the other interfaces described herein.

FIG. 12 shows a graphical user interface 1200 in accordance with an embodiment of the present disclosure. In some embodiments, the graphical user interface 1200 may display an endpoint deployment map via display unit 370. The interface 1200 may illustrate outbreaks of events as they occur over time and link related event outbreaks. In some instances, the interface 1200 may depict a real-time view of events occurring across the network. In other instances, the interface 1200 may display events over a historical period to illustrate events occurring across the network.

In at least one example, the interface 1200 may display endpoints in an outer region 1210. Within that outer region 1210, events may be displayed over the endpoints. For example, the interface 1200 may display a first grouping of related events 1220 and a second grouping of related events 1230. The group of related events 1220 may include multiple icons illustrating particular events 1222/1224/1226/1228 occurring across multiple endpoints and relevant links between the events. The event icons 1222/1224/1226/1228 may be color coded in a way similar to that discussed above with respect to FIG. 11 to indicate a severity of the number of events at that endpoint.

Additionally, the interface 1200 may display information 1240 about each event. In some instances, the additional information 1240 may be a time that the event occurred along with a brief description of the event. Thus, a user or administrator may be able to easily recognize how a particular series of events has spread over time, where the event originated, and how it may be remedied. A user or administrator may also select any of the endpoints shown in interface 1200 as described above with respect to FIGS. 7 and 9 and implement remedial measures if necessary.

At this point it should be noted that presenting information on a graphical user interface in accordance with the present disclosure as described above may involve the processing of input data and the generation of output data to some extent. This input data processing and output data generation may be implemented in hardware or software. For example, specific electronic components may be employed in the presentation of information on a graphical user interface or similar or related circuitry for implementing the functions associated with presenting information on a graphical user interface in accordance with the present disclosure as described above. Alternatively, one or more processors operating in accordance with instructions may implement the functions associated with presenting information on a graphical user interface in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for presenting information on a graphical user interface comprising:

displaying an endpoint interface via the graphical user interface on a display unit, the endpoint interface including outer endpoint icons displayed in an outer ring and inner endpoint icons displayed in an inner ring, the outer and inner rings being concentric rings, each of the outer and inner endpoint icons corresponding to an endpoint deployed within a network, wherein, the endpoint interface lacks lines connecting the endpoint icons to illustrate network topology;

determining, using at least one processor, whether an event mode for the endpoint interface has been selected;

displaying the endpoint interface in the event mode when the event mode has been selected;

determining, using the at least one processor, that a first security event has been detected on a first endpoint of the endpoints deployed within the network corresponding to a first outer endpoint icon of the outer endpoint icons;

in response to determining that the first security event has been detected, displaying the first security event on the first outer endpoint icon in the outer ring of the endpoint interface in the event mode;

determining, using the at least one processor, that a second security event has been detected on a second endpoint of the endpoints deployed within the network corresponding to a first inner endpoint icon of the inner endpoint icons;

in response to determining that the second security event has been detected, displaying the second security event on the first inner endpoint icon in the inner ring of the endpoint interface in the event mode;

determining, using the at least one processor, that the first and second security events are related;

in response to determining that the first and second security events are related, displaying a line connecting the first outer endpoint icon with the first inner endpoint icon; and implementing, using the at least one processor, a remedial measure on the first outer endpoint associated with the first security event and the first inner endpoint associated with the second security event.

2. The method of claim 1, wherein the first security event is displayed on the first outer endpoint icon in the outer ring of the endpoint interface in the event mode by highlighting the first outer endpoint icon.

3. The method of claim 2, further comprising displaying information about the first security event on the first outer endpoint icon in the outer ring of the endpoint interface in response to the first outer endpoint icon being selected by a user.

4. The method of claim 1, wherein the first security event is displayed on the first outer endpoint icon in the outer ring of the endpoint interface in the event mode as a heat map overlaid with the outer and inner endpoint icons.

5. The method of claim 4, wherein the heat map indicates a severity of the first security event.

6. The method of claim 1, wherein the endpoint interface indicates a severity of each of the first and second security events.

7. The method of claim 1, wherein the first security event is caused by at least one of a computer virus executing on the first endpoint, a malware application executing on the first endpoint, and unauthorized activity of a user.

8. The method of claim 1, wherein:
the method further comprises displaying a menu of the remedial measure on the endpoint interface; and
the implementing of the remedial measure is performed in response to determining the remedial measure has been selected via the menu by a user.

9. The method of claim 1, wherein the remedial measure is at least one of quarantining the first endpoint, restricting network privileges for the first endpoint, restricting resource access for the first endpoint, quarantining an application implemented on the first endpoint, restricting network privileges for the application, and restricting resource access for the application.

10. At least one non-transitory processor readable storage medium storing a computer program of instructions configured to be readable by at least one processor for instructing the at least one processor to execute a computer process for performing the method as recited in claim 1.

11. A system for presenting information on a graphical user interface comprising:
one or more processors communicatively coupled to a network, the one or more processors being configured to:
display an endpoint interface via the graphical user interface on a display unit, the endpoint interface including outer endpoint icons displayed in an outer ring and inner endpoint icons displayed in an inner ring, the outer and inner rings being concentric rings, each of the outer and inner endpoint icons corresponding to an endpoint deployed within a network, wherein, the endpoint interface lacks lines connecting the endpoint icons to illustrate network topology;
determine whether an event mode for the endpoint interface has been selected;
display the endpoint interface in the event mode when the event mode has been selected;
determine that a first security event has been detected on a first endpoint of the endpoints deployed within the network corresponding to a first outer endpoint icon of the outer endpoint icons;
in response to determining that the first security event has been detected, display the first security event on the first outer endpoint icon in the outer ring of the endpoint interface in the event mode;
determine that a second security event has been detected on a second endpoint of the endpoints deployed within the network corresponding to a first inner endpoint icon of the inner endpoint icons;
in response to determining that the second security event has been detected, display the second security event on the first inner endpoint icon in the inner ring of the endpoint interface in the event mode;
determine that the first and second security events are related;
in response to determining that the first and second security events are related, display a line connecting the first outer endpoint icon with the first inner endpoint icon; and
implement a remedial measure on the first outer endpoint associated with the first security event and the first inner endpoint associated with the second security event.

12. The system of claim 11, wherein:
the first security event is displayed on the first outer endpoint icon in the outer ring of the endpoint interface in the event mode by highlighting the first outer endpoint icon; and
the one or more processors are further configured to display information about the first security event on the first outer endpoint icon in the outer ring of the endpoint interface in response to the first outer endpoint icon being selected by a user.

13. The system of claim 11, wherein:
the first security event is displayed on the first outer endpoint icon in the outer ring of the endpoint interface in the event mode as a heat map overlaid with the outer and inner endpoint icons; and
the heat map indicates a severity of the first security event.

14. The system of claim 11, wherein the first security event is caused by at least one of a computer virus executing on the first endpoint, a malware application executing on the first endpoint, and unauthorized activity of a user.

15. The system of claim 11, wherein:
the one or more processors are further configured to display a menu of the remedial measure on the endpoint interface; and
the implementing of the remedial measure is performed in response to determining the remedial measure has been selected via the menu by a user.

16. The system of claim 15, wherein the remedial measure is at least one of quarantining the first endpoint, restricting network privileges for the first endpoint, restricting resource access for the first endpoint, quarantining an application implemented on the first endpoint, restricting network privileges for the application, and restricting resource access for the application.

17. The method of claim 1, wherein displaying the first security event on the first outer endpoint icon includes displaying a time that the first security event occurred and wherein displaying the second security event on the first inner endpoint icon includes displaying a time that the second security event occurred.

18. The system of claim 11, wherein the display of the first security event on the first outer endpoint icon includes a time that the first security event occurred and wherein the display the second security event on the first inner endpoint icon includes a time that the second security event occurred.

* * * * *